United States Patent [19]
Ahmed et al.

[11] Patent Number: 5,432,785
[45] Date of Patent: Jul. 11, 1995

[54] BROADBAND PRIVATE VIRTUAL NETWORK SERVICE AND SYSTEM

[75] Inventors: Masuma Ahmed, Middletown; Stephen M. Walters, Holmdel, both of N.J.

[73] Assignee: Bell Communications Research, Inc., Livingston, N.J.

[21] Appl. No.: 192,763

[22] Filed: Feb. 7, 1994

Related U.S. Application Data

[63] Continuation of Ser. No. 964,330, Oct. 21, 1992, abandoned.

[51] Int. Cl.⁶ .......................... H04J 3/24; H04Q 11/04
[52] U.S. Cl. ..................................... 370/60.1; 370/94.2
[58] Field of Search ...................... 370/15, 16, 54, 58.1, 370/58.2, 58.3, 60, 60.1, 94.1, 94.2, 110.1, 112

[56] References Cited

U.S. PATENT DOCUMENTS

| | | | |
|---|---|---|---|
| 5,050,162 | 9/1991 | Golestani | 370/60 |
| 5,067,123 | 11/1991 | Hyodo et al. | 370/94.1 |
| 5,115,427 | 5/1992 | Johnson, Jr. et al. | 370/60 |
| 5,119,369 | 6/1992 | Tanabe et al. | 370/60 |
| 5,177,736 | 1/1993 | Tanabe et al. | 370/15 |
| 5,224,092 | 6/1993 | Brandt | 370/94.1 |
| 5,239,537 | 8/1993 | Sakauchi | 370/16 |
| 5,265,088 | 11/1993 | Takigawa et al. | 370/15 |

OTHER PUBLICATIONS

"A new Direction for Broadband ISDN", Stephen Walters, IEEE, Sep. 1991, pp. 39–42.

Primary Examiner—Alpus Hsu
Attorney, Agent, or Firm—Leonard Charles Suchyta; Joseph Giordano

[57] ABSTRACT

A system and method for operating a Broadband ISDN to support a viable virtual private network (VPN) service are attained by establishing a plurality of virtual path links connecting customer locations and broadband switching systems, by cross-connecting virtual channel links at the broadband switching systems to establish end-to-end virtual channel connections, and by policing both the input and output traffic only on the virtual path links. An egress policing processor is included at each output port on broadband switches to police the traffic on each virtual path link which contains one customer's multiplexed virtual channel connection traffic.

7 Claims, 9 Drawing Sheets

Table 1:

|  | CPN 121 | CPN 122 | CPN 123 | CPN 124 |
|---|---|---|---|---|
| CPN 121 |  | 3,15 | 5,15 | 5,10 |
| CPN 122 | 3,15 |  | 10,15 | 5,10 |
| CPN 123 | 5,15 | 10,15 |  | 5,20 |
| CPN 124 | 5,10 | 5,10 | 5,20 |  |

BROADBAND PRIVATE VIRTUAL NETWORK SERVICE AND SYSTEM

This application is a continuation of application Ser. No. 07/964,330 filed on Oct. 21, 1992, now abandoned.

CROSS REFERENCE TO RELATED APPLICATIONS

This patent application is related to U.S. patent application Ser. No. 07/964,332 entitled "System and Method for Providing Egress Policing for Broadband Virtual Private Networks" by Ahmed et al., bearing attorney docket number 646, and filed on the same date as this application, now abandoned.

TECHNICAL FIELD OF THE INVENTION

This invention relates to a broadband communication service and system and more specifically to a new Broadband Virtual Private Network (BVPN) service, and a system for providing such a service.

BACKGROUND OF THE INVENTION

Over the last few years the telecommunications industry has devoted a considerable amount of work and time toward defining the capabilities of Broadband ISDN (B-ISDN). The goal has been to match transport capabilities available in B-ISDN to potential user applications. Examples of such user applications are accessing remote data bases with very low latency, transmitting large multimedia files containing photographic quality images and/or video snipets, and performing desktop multimedia teleconferencing including video. All of these applications demand high-speed transmission and switching within the interconnection network and many require new signaling capabilities beyond that of the current ISDN signaling protocol Q.931.

However, many people knowledgeable about the network recognize that the time-frame necessary to deploy all of these capabilities is well into the future; therefore it is believed that this feature-rich B-ISDN technology is still years away. Accordingly, there is a market opportunity for a broadband service that can be quickly and inexpensively deployed. Such a market opportunity can be met with a virtual private network capability deployed within the B-ISDN public network.

B-ISDN is characterized by the transport of Asynchronous Transport Mode (ATM) cells over ATM connections. ATM cells are fixed length packets which contains addressing and transmission instructions along with user data. This allows ATM cells to be independently addressed and transmitted on demand over ATM connections facilitating transmission bandwidth to be allocated, as needed, without fixed hierarchical channel rates. ATM connections are set-up between various nodes in the network and also between the customer premises equipment and the network nodes. ATM connections are organized in two levels: virtual channels (VCs) and virtual paths (VPs). End-to-end virtual channel connections are made up from virtual channel links which are switched or cross-connected at the broadband switching systems. Virtual channel links are carried within virtual path links which in turn are switched or cross-connected to form end-to-end virtual path connections. The virtual channel identifier (VCI) and virtual path identifier (VPI) fields in the ATM cell header identify the virtual channel link and the virtual path link to which the ATM cells belong. Multiple virtual channel links (of varying bandwidths) can be grouped into virtual path links and multiple virtual channel links and virtual path links can be carried on a physical link. Virtual channel connections and virtual path connections are bi-directional with either symmetric or asymmetric cell transfer capability.

One of the basic characteristics of ATM networks is the provisioning of ATM traffic parameters at the user-network access interfaces (UNIs) and the network-node interfaces (NNIs). The ATM traffic parameters describe the traffic characteristics such as cell transfer rate and quality of service of an ATM connection (which can be a virtual channel connection or a virtual path connection). Traffic parameters include, but are not limited to, peak cell transfer rate, average cell transfer rate, and burst length. Currently, only peak cell transfer rate has been standardized into CCITT I.371 1992 recommendations. Even though a customer can contract for a peak cell transfer rate on an ATM connection, in principle, the user could exceed the negotiated traffic parameter up to the maximum capacity of the physical facility. Therefore, a network function called "usage parameter control" or "policing" as defined in CCITT recommendation I.311. is needed. This function controls the cell stream during the entire active phase of the ATM connection and restricts the peak traffic to the characteristics negotiated in the contract. Thus, it will protect the network against excessive congestion resulting in a degradation of the quality of service of all connections sharing the same network resources.

To protect all network resources, the policing function is located as close as possible to the actual traffic source and is under the control of the network providers. Depending on the service being provided, the policing function may be performed on virtual channel links or on virtual path links. The prior art policing function is performed at the ingress of the broadband switching systems at both the user-network interfaces and the network-node interfaces. To protect the network and the coexisting connections, actions must be taken by the policing function after detecting a violation of the contract. The prior art policing action is to discard those cells which are in violation of the traffic contract. Other policing actions, such as marking the violating cells as low priority cells and discard them only during network congestion, are being discussed in the art.

The prior art B-ISDN allows for the deployment of Virtual Private Network (VPN) services by either cross-connecting virtual channel links (Virtual Channel Cross-connect (VCX) functionality) or cross-connecting virtual path links (Virtual Path Cross-connect (VPX) functionality). In the prior art B-ISDN, when cross-connecting virtual channel links, policing is accomplished on the traffic on the virtual channel links. Similarly, when cross-connecting virtual path links, the policing is accomplished only on the traffic carried on the virtual path links. Therefore, when using VPX or VCX functionality to deploy Virtual Private Networks, ATM connections and its bandwidth (peak cell transfer rate) are directly coupled. As a result, as the number of customer locations and therefore the number of desired connections in a VPN increases, the transmission capacity needed on the physical facilities must increase to support the cumulative bandwidth of all the connections on the facility even though all the connections would never be simultaneously active with traffic at their peak bandwidth. This excess provisioning of transmission capacity can cause the whole concept of virtual private networks (VPNs) to fail. Therefore, a primary objective of our invention is to provide a viable private network capability by separating bandwidth from connectivity requirements.

SUMMARY OF THE INVENTION

Our invention is a system and method for operating a Broadband ISDN to support a viable virtual private network (VPN) service. This is accomplished by establishing a plurality of virtual path links connecting customer locations and broadband switching systems, by cross-connecting virtual channel links at the broadband switching systems to establish virtual channel connections, and by policing both the input and output traffic only on the virtual path links. Therefore, the individual virtual channel link bandwidth is not policed and the traffic on any virtual channel link can periodically reach, as needed, the peak cell transfer rate of the virtual path link which contains it, thereby uncoupling the bandwidth from the connection. However, to support multiple VPNs in a public network, it is required to police traffic on the virtual path links at the egress of the broadband switching systems in order to protect the quality of service of each VPN. Therefore, an additional aspect of our invention is to include a policing processor on the output ports of the broadband switching systems for each virtual path link.

DETAILED DESCRIPTION

Figure 1:
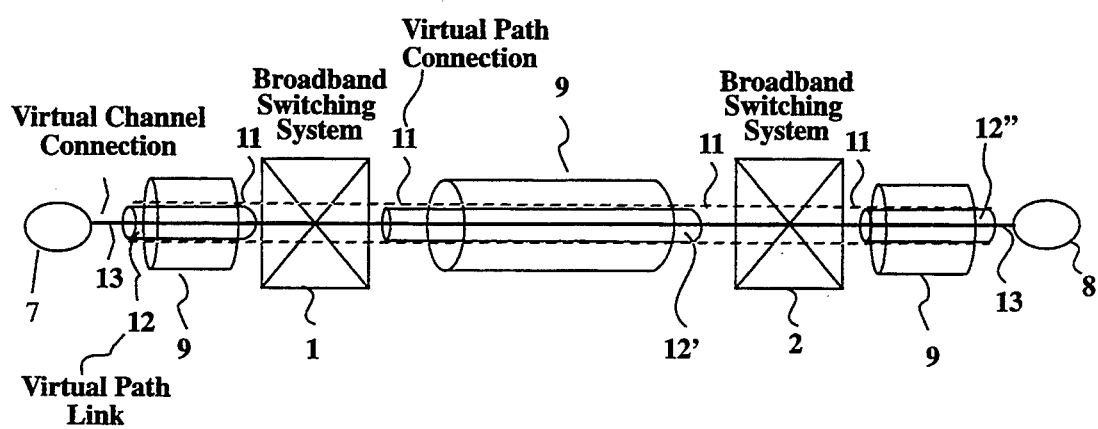
FIG. 1 depicts the relationship between a virtual paths and virtual channels in a Broadband ISDN.

The relationships between a virtual path, a virtual channel, the physical facility, and the network elements must be clearly understood to facilitate a detailed description of our invention. FIG. 1 illustrates these relationships. A virtual channel connection 13 is an end-to-end connection between customer premises network 7 and 8 contained, exclusively, within virtual path connection 11. The virtual path connection 11 is established by cross-connecting virtual path links 12 and 12′ at broadband switching system 1 and by cross-connecting virtual path links 12′ and 12″ at broadband switching system 2. The virtual path links and virtual channel connections are both carried within physical facilities 9.

Figure 2:
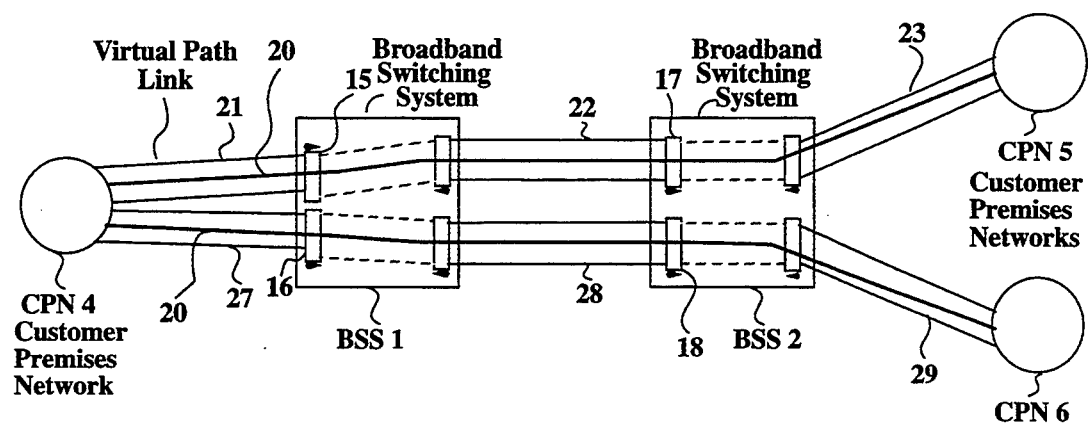
FIG. 2 illustrates the prior art virtual path connections and virtual channel connections in Broadband ISDN.

FIG. 2 depicts a prior art B-ISDN providing virtual private network (VPN) services using virtual path connections. Three customer premises networks, customer premises network 4, customer premises network 5 and customer premises network 6, are connected to form a customer's VPN using VPX functionality. Customer premises network 4 and customer premises network 5 are connected by a virtual path connection which was established by cross-connecting at the broadband switching system 1 virtual path link 21 and virtual path link 22, and by cross-connecting at broadband switching system 2 virtual path link 22 and virtual path link 23. Customer premises network 4 and customer premises network 6 are connected by virtual path connection, which was established by cross-connecting at broadband switching system 1 virtual path link 27 and virtual path link 28, and by cross-connecting at broadband switching system 2 virtual path link 28 and virtual path link 29. Within each virtual path connection, the customer can set-up multiple virtual channel connections which are transparent to broadband switching system 1 and broadband switching system 2. It is important to note that in the prior art B-ISDN providing VPN services, an entire virtual channel connection must be contained within and coincident with a virtual path connection. An example virtual channel connection 20 is shown as contained within the virtual path connection established between customer premises networks 4 and 5. Ingress policing on the originating traffic from customer premises network 4 carried by virtual path link 21 and virtual path link 27 is accomplished at the user-network access interfaces by policing processor 15 and policing processor 16, respectively at broadband switching system 1. Ingress policing on the incoming traffic originating from customer premises network 4 carried by virtual path link 22 and virtual path link 28 is accomplished at the network-node interfaces at broadband switching system 2 by policing processor 17 and policing processor 18, respectively. (Note: the arrows shown in FIG. 2 depict the traffic direction on which the policing processor operates). These are the only four places where the traffic originating from customer premises network 4 is policed. In this architecture, bandwidth and connectivity (i.e. virtual path bandwidth and virtual path connections) are directly coupled which is a fundamental problem in using this prior art B-ISDN architecture for providing VPN services.

To illustrate the problem, let us assume that each customer premises network in the example VPN is a 10 Mb/s LAN. Therefore at any instant of time, each customer premises network in the example VPN can transmit or receive ATM cells up to the 10 Mb/s rate. As a result, the virtual path connections between networks 4 and 5 and networks 4 and 6 both have to be provisioned to support a peak bit rate of 10 Mb/s, each. Therefore, the physical facility between customer premises network 4 and broadband switching system 1 must be provisioned to support at least 20 Mb/s (10 Mb/s for each virtual path link) even though customer premises network 4 has a maximum transmission capability of only 10 Mb/s. As the number of customer locations in a VPN increases, for example to 20 locations, the transmission capacity needed on the physical facility between customer premises network 4 and broadband switching system 1 for example, must be capable of supporting a transmission rate of 190 Mb/s (10 Mb/s for 19 virtual path links to accommodate 19 virtual path connections) even though customer premises network 4 can receive and transmit at only 10 Mb/s. This excessive provisioning of the transmission capacity makes the whole concept of virtual private networks (VPNs) in the prior art technically not viable and completely uneconomical.

The service architecture of our Broadband Virtual Private Network (BVPN) which eliminates the excessive provisioning of transmission capacity problem described above is depicted in FIG. 3. Individual virtual path links 32, 32' and 32" connect each of the customer premises networks 4, 5 and 6 to a broadband switching system 30 and 31. A virtual path link 33 also connects broadband switching system 30 to broadband switching system 31. Virtual path links 32, 32', 32" and 33 belong to one customer and carry only that customer's traffic. However, in comparison to the prior art B-ISDN, the virtual path links in our invention are not connected into a virtual path connection and each of the virtual path links 32, 32', 32" and 33 may have different traffic characteristics. Furthermore, our network establishes virtual channel connections by cross-connecting virtual channel links at each broadband switching system. The virtual channel links are established within the virtual path links. For example, within virtual path link 32 connecting customer premises network 4 to broadband switching system 30 is virtual channel link 34', within virtual path link 33 connecting broadband switching system 30 and broadband switching system 31 is virtual channel link 34", and within virtual path link 32' connecting broadband switching system 31 and customer premises network 5 is virtual channel link 34'''. Each broadband switching system then cross-connects the virtual channel links to establish the end-to-end connection. In this architecture, only the virtual channel connections have end-to-end capability and the aggregate traffic on the virtual channel connections are controlled at the ingress on the virtual path links using policing processors 43, 44, 45 and 46. Again, the arrows depict the traffic direction on which the policing processors operate. Policing processor 43 manages the traffic on the virtual path link 32 to within contracted parameter values. The traffic on the virtual channel connection is not policed. In this way, a completely arbitrary number of connections to any number of locations may be provided but without fixing their individual bandwidth. This allows connectivity and bandwidth to be specified independently.

Figure 3:
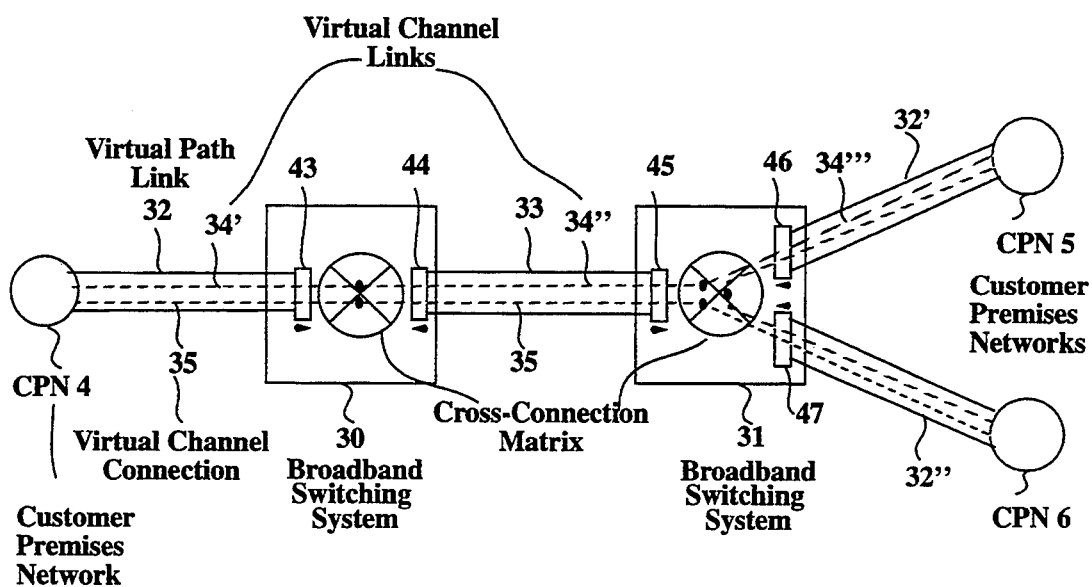
FIG. 3 depicts an illustrative embodiment of our inventive service architecture.

A second aspect our invention addresses the problem of multiple customers in a BVPN affecting each others service performance as would be experienced in the prior art architecture, again consider FIG. 3 with each customer premises network being a 10 Mb/s LAN. Since, the customer premises network 4 can only transmit and receive, in aggregate, at a 10 Mb/s rate, and since virtual channel connections can be established to the other two locations using only a single virtual path link on the access facility, virtual path link 32 need only be provisioned to support a maximum traffic load of 10 Mb/s. In the prior art, each set of virtual channel connections to different customer locations required their own virtual path and consequently their own virtual path link on the access facility thereby, requiring the access facility to be provisioned to support 20 Mb/s.

Since the equipment supporting our BVPN can be shared by several different customers, a single physical network is cost effective and attractive to customers provided that the various BVPNs do not interfere with each other. To prevent this interference, traffic management capabilities (i.e. policing) is introduced in the network to prevent one user's excess traffic from degrading the quality of service available to another B-ISDN customer. The needed traffic management capabilities place special requirements on the broadband switching systems to provide the BVPN.

Figure 4:
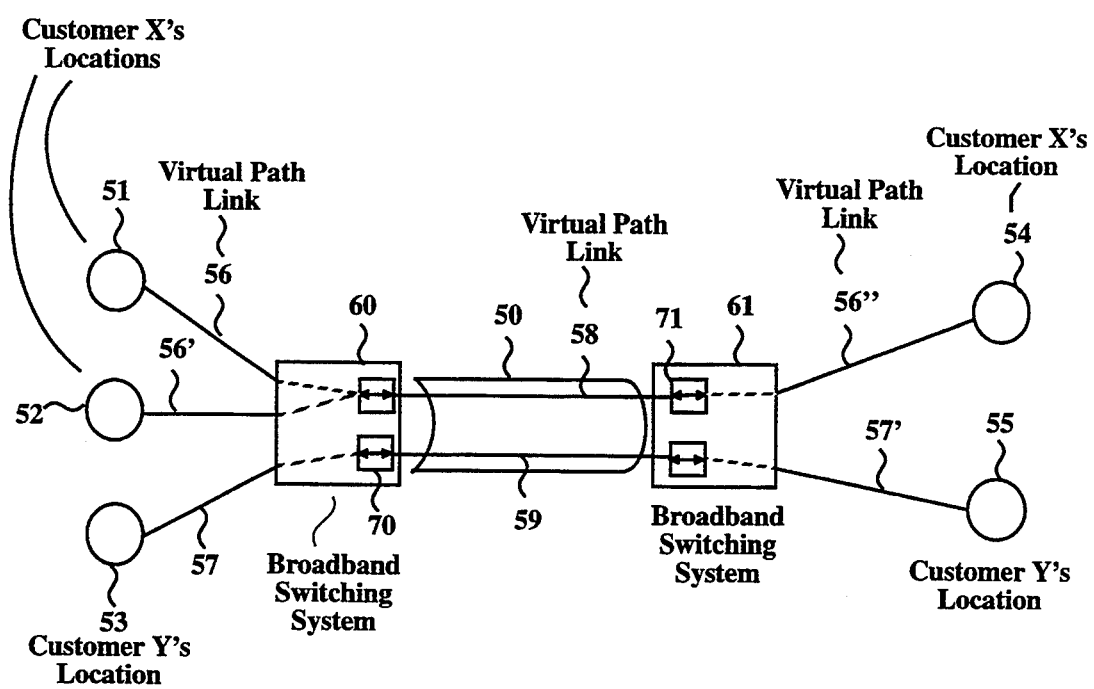
FIG. 4 depicts an embodiment of our invention when two private virtual networks share facilities.

Consider the simple network depicted in FIG. 4 which illustrates our BVPN service on a B-ISDN with users sharing B-ISDN resources. A customer X has three locations 51, 52, and 54 connected in one virtual private network. A second customer Y has two locations 53 and 55 connected in a second virtual private network. Each of customer's X's locations has established a 50 Mb/s virtual path link 56, 56' and 56" to one of the broadband switching systems 60 and 61, while each of customer Y's locations has established a 100 Mb/s virtual path link 57 and 57' to one of the broadband switching systems 60 and 61. Additionally, customer X has established a 50 Mb/s virtual path link 58 on transmission facility 50, while customer Y has established a 100 Mb/s virtual path link 59 on transmission facility 50. Customer X can set up multiple virtual channel connections between its locations. Thus, customer X's location 51 could send up to 50 Mb/s to customer X's location 54 one virtual channel connection while customer X's location 52 can also send up to 50 Mb/s to customer X's location 54.

Current art broadband switching systems limit the input traffic they receive from customer access lines to a negotiated value using a policing processor (referred to in the art as a Usage Parameter Control (UPC) device) on the input side of the network. In order for customer X and Y to share the interoffice facility 50, policing the outgoing traffic on each customer's interoffice virtual path links is necessary (i.e. egress policing). The need for egress policing is due to the fact that when customer X transmits 50 Mb/s simultaneously from locations 51 and 52, 100 Mb/s is transmitted on virtual path link 58. With the interoffice facility only capable of 150 Mb/s and with customer X causing 100 Mb/s traffic on virtual path link 58, customer X is effectively leaving customer Y with only 50 Mb/s bandwidth thereby affecting customer Y's quality of service. Therefore, it is a second aspect of our invention to provide an egress policing processor at the output of each broadband switching system for each virtual path link. Our inventive architecture provides for a policing processor on the output port of the broadband switching systems for each virtual path link. Egress policing processors 70 are depicted in FIG. 4 with the arrows indicating the direction of the traffic that is policed. The policing processors have arrows pointing both ways to indicate that the traffic is policed in both directions: on the input as ingress policing used in the prior art, and on the output as egress policing as disclosed herein. The realization of egress policing is dependent on the broadband switching system architecture.

Figure 5:
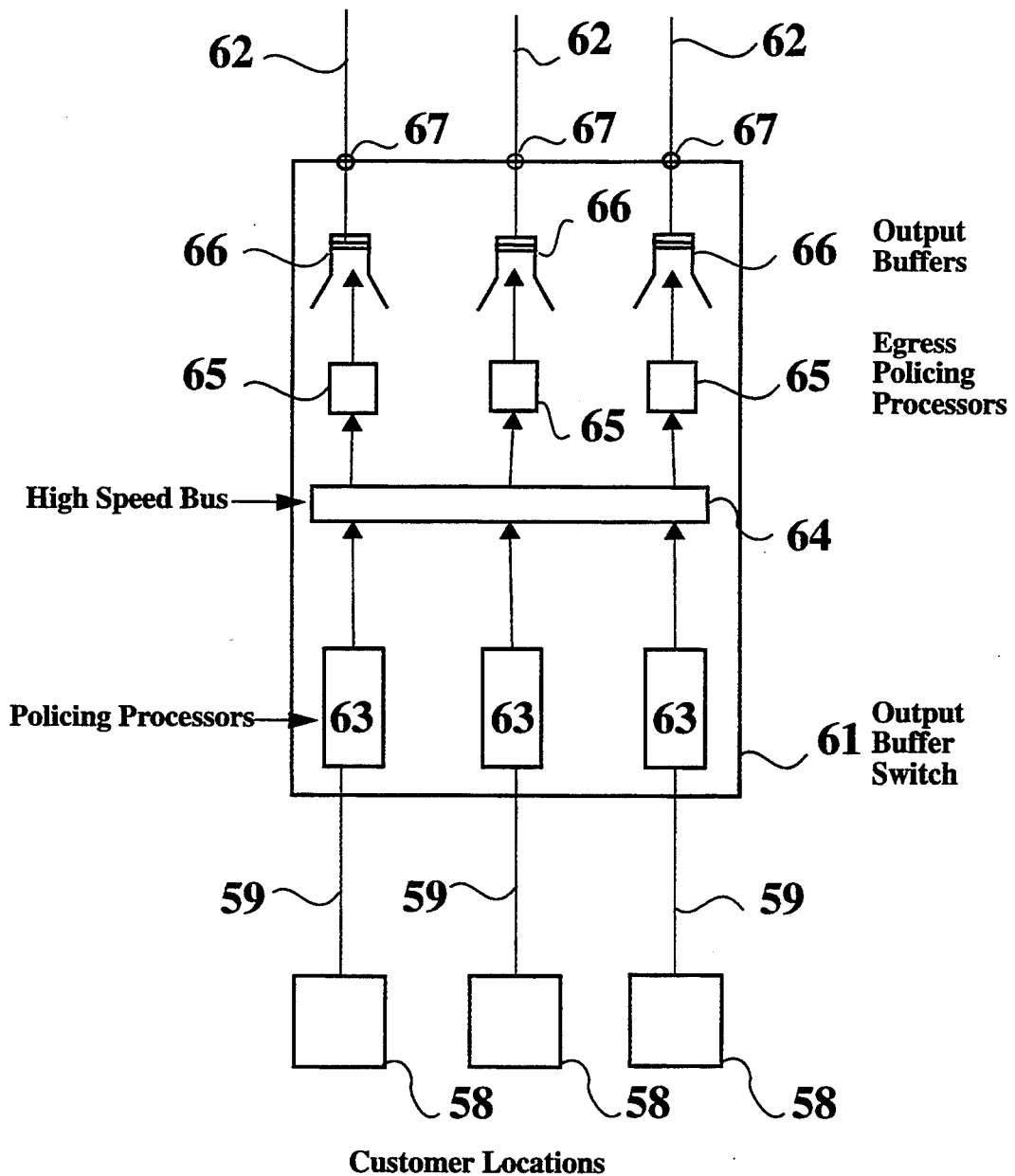
FIG. 5 illustrates egress policing on an output buffer type switch.

There are three major implementation architectures for broadband switches. These are: input buffer type, shared buffer type, and output buffer type. In our preferred embodiment we disclose egress policing on an output buffer type switch, although the inventive concept is equally applicable to the other two switch architectures. FIG. 5 illustrates such an embodiment. In the output buffer type switch 61, all input cells from customer's networks 58 on customer's access lines 59 are policed at a policing processor 63 on a negotiated value. All cells that pass through the policing processors 63 are multiplexed on a high-speed internal bus 64. Cells on the internal bus 64 are directed toward an appropriate output port 67 and stored in a buffer 66 equipped to each output port. In a typical prior art output buffer switch, the output buffer is shared by many virtual paths and virtual channels. To realize egress policing, policing processors 65 are placed between the internal bus 64 and the output buffers 66 which are then segregated and dedicated to each virtual path link 62 at output port 67.

Figure 6:
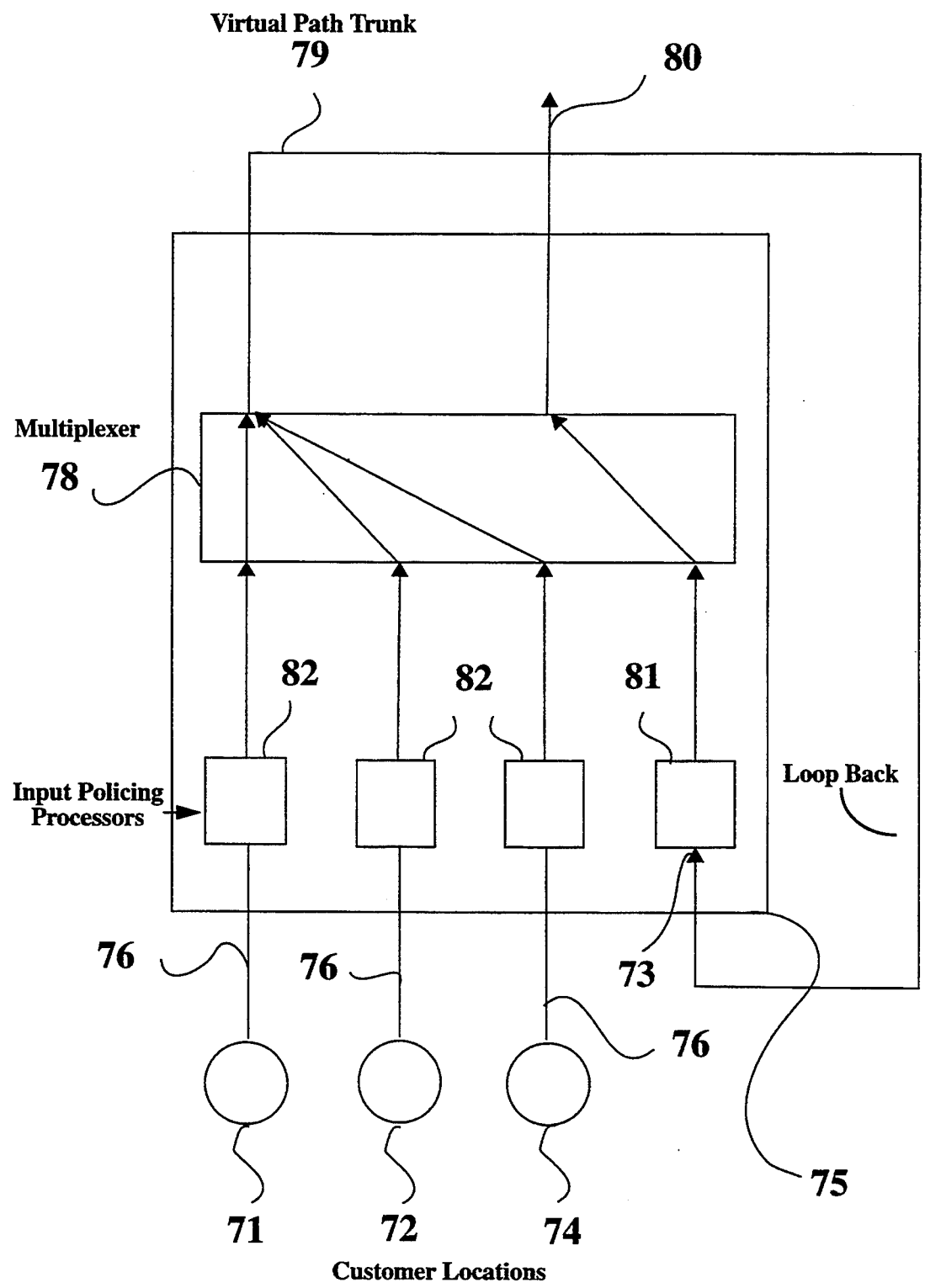
FIG. 6 depicts our method for providing egress policing using a loopback of grouped traffic into a broadband switching system input port.

An alternative embodiment, as set forth in the above cited Ahmed et al. patent application, does not require the introduction of a policing processor at the output port of the broadband switching systems. The point of our BVPN is to use transmission facilities efficiently. FIG. 6 shows this alternative embodiment. In this architecture, traffic from customer locations 71 and 72 over access lines 76 are policed by ingress policing processors 82 and then are multiplexed at multiplexor 78 into a virtual path trunk line 79. This trunk line does not require a special trunk circuit, but is physically looped back to input port 73 of broadband switching system 75. At input port 73, an ingress policing processor 81, similar to the policing processors 82 at all the input ports, is used to provide the desired egress policing function i.e. to police the aggregated traffic to a negotiated virtual path link transmission capacity. The multiplexed traffic can then be combined with the traffic from another customers' location 74 for transport on physical facility 80.

In this switch architecture, extra switching ports and capacity are needed. The maximum number of extra switching ports is equal to the total number of outgoing virtual path links used for the BVPN. However, the actual number of extra ports needed for the broadband switching systems may be less than this maximum. If the aggregated input capacity is equal to or less than an output virtual path link capacity, the output virtual path link can be directly multiplexed with other customers' traffic on the same physical transmission link. In this case, the extra port is unnecessary.

Figure 7:
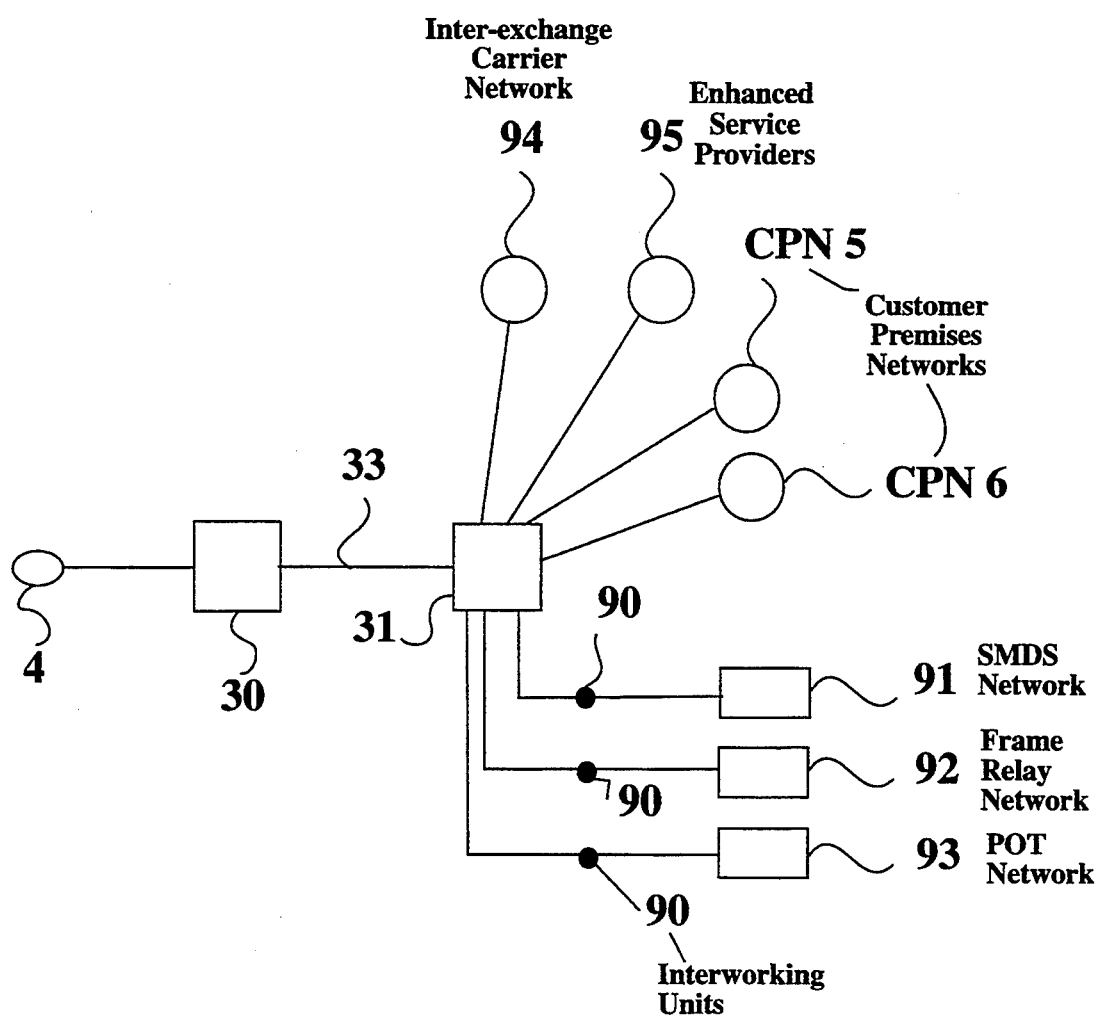
FIG. 7 illustrates an extension of our BVPN.

As shown in FIG. 3 and FIG. 4, our BVPN simply interconnects the customer's locations. The result is an island network which does not allow traffic to be routed outside the private network and provides only point-to-point connections. However, various extensions could be provided. These are shown in FIG. 7. There the basic BVPN, connecting customer premises networks 4, 5, and 6 via broadband switching systems 30 and 31, has been supplemented with interworking units 90 for access to any pre-existing services, such as Switched Multimegabit Services (SMDS) 91, Frame Relay Service 92, or Plain Old Telephone Service (POTS) 93. It could also support access to Inter-Exchange Carder (IEC) 94 service providers or to Enhanced Service Providers (ESP) 95.

Figure 8:
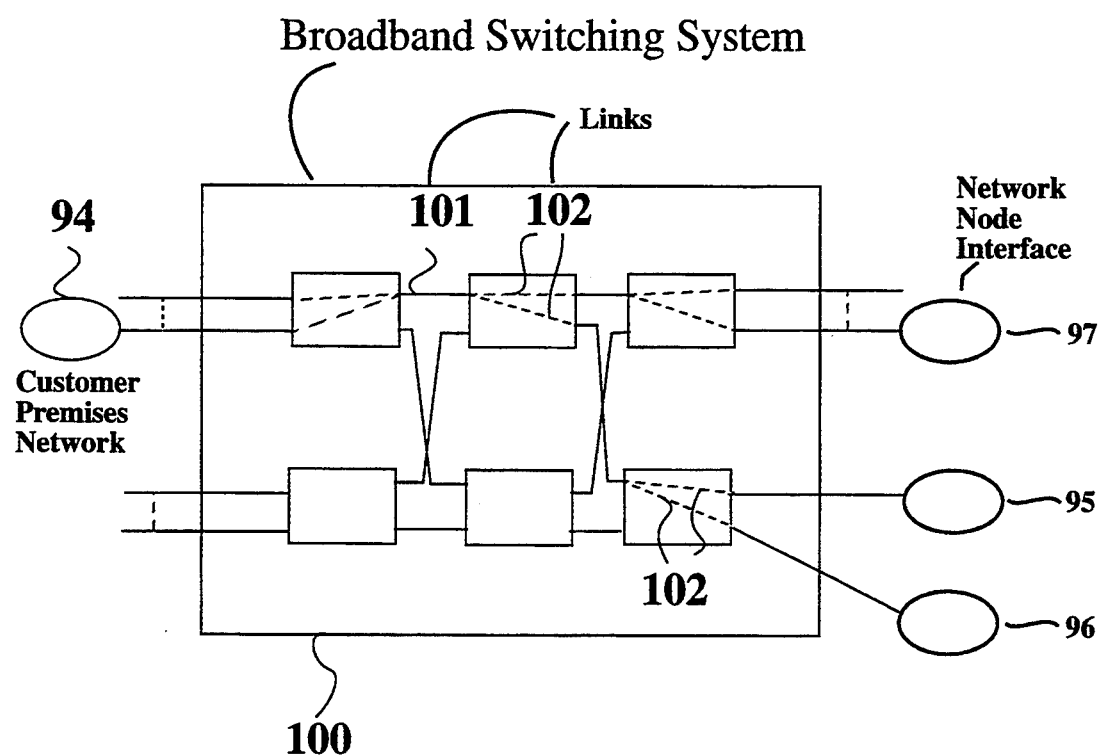
FIG. 8 illustrates resource allocation within a broadband switching system.

In our BVPN network, the bandwidth of the virtual channel connections in a virtual path link can vary with time, and at any instant of time, the bandwidth of a virtual channel connection can equal the peak capacity of the virtual path link. Therefore, the virtual channel connections established between the input and output ports in a broadband switching system are required to transport any cell transfer rate up to the peak capacity of its virtual path links. This requirement on virtual channel connection cell transfer rate increases the required capacity of a broadband switching system. It is another aspect of our invention to optimize broadband switching system resource allocation. FIG. 8 depicts one method for resource allocation. In the figure, the virtual channels from customer premises network 94 destined to customer premises network 95, customer premises network 96 and the Network-to-Node interface (NNI) 97 through our broadband switching network 100, would go through the same link 101 until it is necessary to fan them out on separate links 102.

Figure 9:
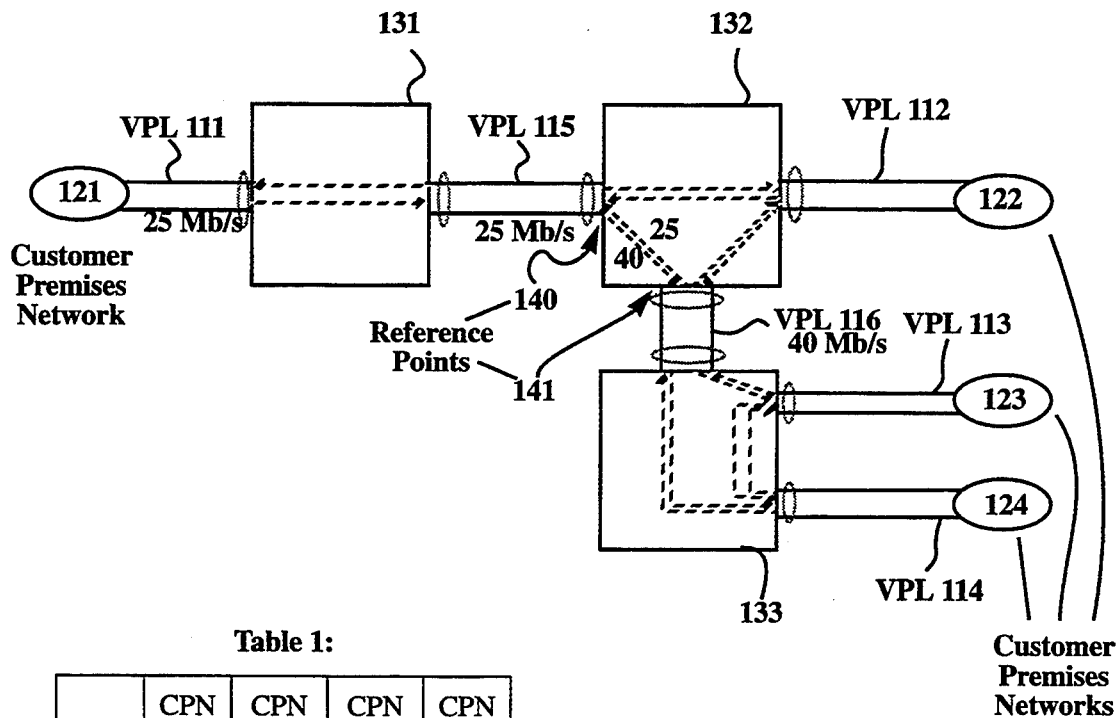
FIG. 9 depicts an example of resource allocation within our BVPN.

An example of BVPN traffic matrix with BVPN resource allocation is illustrated in FIG. 9. For the purpose of the analysis, the traffic flow between any two customer premises network locations is assumed to be bidirectional and symmetric. The virtual path link capacities at the access could be estimated as follows:

$$R_{peak}(VPL111) = \sum_{122}^{124} R_{min}(121, j) + \max \Delta R(121, j), j = 122, 123, 124)$$

where:

$$\Delta R(i,j) = R_{max}(i,j) - R_{min}(i,j)$$

$R_{min}(i,j)$ = minimum traffic capacity between customer locations i and j $R_{max}(i,j)$ = maximum traffic capacity between customer locations i and j Thus, the peak traffic capacity for virtual path link 111 can be calculated using the expected minimum and maximum traffic between customer locations as shown in Table 1. Each ordered pair in Table 1 depicts the minimum and maximum traffic, respectively, between the labeled customer premises networks (CPNs). As shown, the minimum traffic between CPN 121 and CPN 122 is 3 Mb/s, between CPN 121 and CPN 123 is 5 Mb/s, and between CPN 121 and CPN 124 is 5 Mb/s. Using the equation above, the expected peak traffic capacity for virtual path link 111 is calculated by first summing the minimum values (equaling 13 Mb/s) and then adding that sum to the maximum of the difference between the minimum and maximum expected traffic between CPN 121 and the other CPNs. In this case the maximum of the difference is 12 Mb/s which is the difference between the minimum and maximum traffic expected between CPN 121 and CPN 122. Therefore the peak traffic allocation for virtual path link 111 is 25 Mb/s (the 13 Mb/s sum plus the 12 Mb/s maximum difference).

As disclosed earlier, the bandwidth of the virtual channel connections within a virtual path link can vary with time and therefore could increase the internal capacity of a virtual channel cross-connect capability within a broadband switching system. The equation above can be used to determine the peak traffic between any two input and output ports. Furthermore, the virtual channel cross-connected within a broadband switching systems are bidirectional but do not necessarily have symmetric capabilities. For example, as shown in FIG. 9, the peak capacity allocated to virtual channels going from reference point 140 to reference point 141 is 25 Mb/s, whereas peak capacity allocated to the same virtual channels in the opposite direction is 40 Mb/s. Also, note that the combined traffic from customer premises network 122, customer premises network 123, and customer premises network 124 destined for virtual path link 115 could exceed its peak capacity, 25 Mb/s, if the outgoing traffic is not policed.

It is to be understood that the system and method for providing Broadband Virtual Private Network Service on a Broadband ISDN public network illustrated herein are not limited to the specific forms disclosed and illustrated, but may assume other embodiments limited only by the scope of the appended claims.

We claim:

1. A broadband system for providing a virtual private network capability to customers each having a plurality of locations and comprising:
   a plurality of broadband switching systems each having input and output ports;
   a plurality of virtual path links connecting said customer locations to one of said broadband switching systems and connecting any two of said broadband switching systems;
   a plurality of virtual channel links contained within said virtual path links;
   virtual channel connections between any two of said plurality of customer locations established by cross-connecting said virtual channel links at said broadband switching systems;
   means for policing incoming traffic on said virtual path links at said input ports on said broadband switching systems; and
   means for policing outgoing traffic on said virtual path links at said output ports of said broadband switching systems.

2. A broadband system as recited in claim 1 wherein each of said plurality broadband switching systems comprise:
   means for multiplexing all traffic from a plurality of one customer's locations into one of said virtual path links.

3. A broadband system as recited in claim 2 wherein said means for policing incoming traffic and means for policing outgoing traffic on said virtual path links each comprises:
   means for regulating traffic on said multiplexed virtual channel connections wherein a customer may transmit on any virtual channel the peak bandwidth allocation for any of said virtual path links without affecting the service provided to other customers.

4. A broadband ISDN system for providing a virtual private network capability comprising:
   at least one broadband switching system further comprising
   a plurality of input/output ports,
   means for cross connecting virtual channel links between one of said input/output ports and another of said input/output ports to establish end-to-end virtual channel connections,
   means for policing the incoming traffic on a first virtual path link at said input ports,
   means for policing the outgoing traffic on a second virtual path link at said output ports, and
   a broadband access line from each of a plurality of customer locations to any one of said broadband switching systems;
   a plurality of virtual path links containing a plurality of one customers' virtual channel links on said broadband access line connecting said customer locations; and
   a plurality of virtual channel connections established between said customer locations by said means for cross-connecting where the combined outgoing traffic of one customer's virtual channel connections is policed by said outgoing traffic policing means on said first virtual path link, and where one customer's combined incoming traffic from that customer's virtual channel connections on said second virtual path link is policed by said incoming traffic policing means.

5. A method for operating a broadband ISDN having a plurality of broadband switching systems and broadband transport facilities for providing a customer a broadband private virtual network service, said method comprising the steps of:
   providing the customer with the capability to establish virtual channel connections by cross-connecting virtual channel links at said broadband switching systems between a plurality of customer locations;
   establishing virtual path links containing said virtual channel links between said customer locations and said broadband switching systems, and between said broadband switching systems;
   multiplexing said virtual channel connections together at each of said broadband switching systems for routing over said virtual path links,
   policing the incoming traffic on said virtual path links at input ports on said broadband switching systems; and
   policing the outgoing traffic on said virtual path links at output ports on said broadband switching system.

6. The method as recited in claim 5 wherein said step of policing the incoming traffic and said step of policing outgoing traffic further comprises:
   limiting the total traffic volume on each of said virtual path links below some specified threshold independently established for each of said virtual path links.

7. The method as recited in claim 6 wherein said traffic on said broadband switching systems is comprised of ATM cells and wherein said limiting the traffic volume step comprises:
   discarding those ATM cells which exceed said specified threshold.

* * * * *